United States Patent

[11] 3,586,840

| | | | |
|---|---|---|---|
| [72] | Inventor | John Henry Stuart Craig |
| | | Hitchin, England |
| [21] | Appl. No. | 728,171 |
| [22] | Filed | May 10, 1968 |
| [45] | Patented | June 22, 1971 |
| [73] | Assignee | Serck R. & D. Limited |
| | | Birmingham, England |
| [32] | Priority | May 16, 1967 |
| [33] | | Great Britain |
| [31] | | 22666/67 |

[54] PROCESS CONTROL APPARATUS
4 Claims, 1 Drawing Fig.

[52] U.S. Cl. ............................................. 235/151.1, 235/92
[51] Int. Cl. ...................................... G05b 19/02, G05b 1/01
[50] Field of Search........................................ 235/92, 29, 28, 151.1, 151.3

[56] References Cited
FOREIGN PATENTS
1,106,651   3/1968   Great Britain................ 235/151.1

*Primary Examiner*—Eugene G. Botz
*Attorney*—Holman & Stern

ABSTRACT: A process control apparatus is provided in which an error signal and a rate of change signal are generated in respective subcycles of the cycle of operation of the apparatus. These signals are generated as residual count states in a counter. Corrections to the position of a control element, under the influence of which the parameter being measured can be changed, are made independently at the end of the error signal generating subcycle and the end of rate-of-change signal generating subcycle.

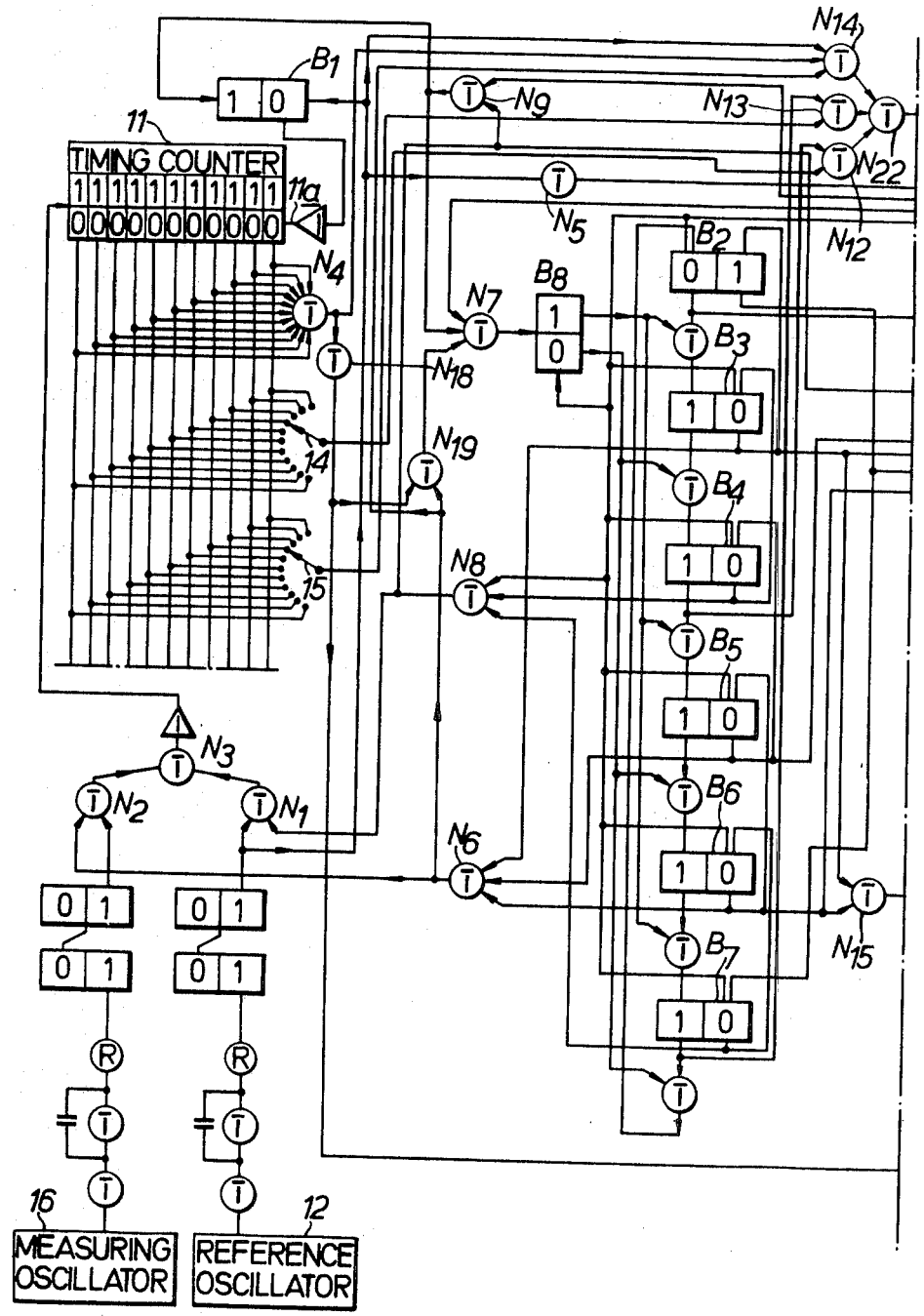

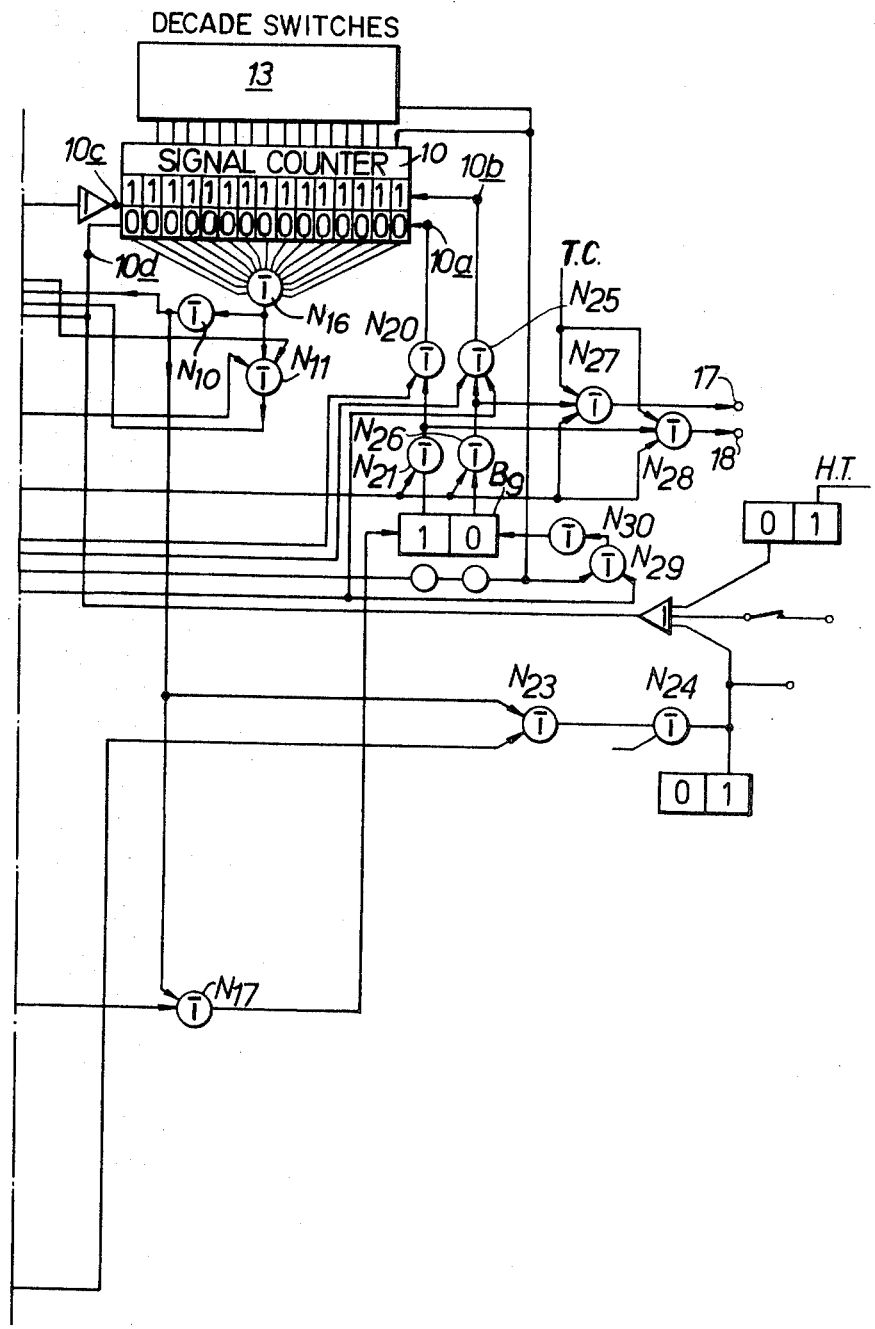

PROCESS CONTROL APPARATUS

The Complete Specification of British Pat. application No. 1,106,651 describes and claims a process control apparatus of the kind in which the value of a parameter is measured and is compared with the desired value of the parameter and a control element is adjusted to cause the parameter to approach its desired value. According to claim 1 of the said Complete Specification the control apparatus comprises a first counting device, means for producing in said counting device a count state corresponding to the desired value of the parameter, first means, including an element sensitive to the value of the parameter, for producing a pulsating signal the mean frequency of which is dependent on the value of the parameter, means arranged to vary the count state of the counting device by a number dependent on said frequency during a stage of the cycle of operation of the apparatus to produce a residual count state which determines the required degree of adjustment of the control element, a second means for producing a pulsating signal at a constant frequency, means whereby said constant frequency signal is admitted to the first counting device during a later stage of the cycle of operation of the apparatus to cause the count state of said first counting device to approach a predetermined value, and means whereby a signal is applied, in use, for the duration of said later stage to adjust the control element, the degree of adjustment thereof during any cycle being dependent on the duration of said later stage which is in turn dependent on the count state existing in said first counting device at the commencement of said later stage. In particular the apparatus described in the said Complete Specification is arranged to repeat a cycle consisting of a. programming the counter with the desired value count state, b. subtracting from the count state a number dependent on the frequency of the pulsating signal, c. adding to the residual count a number dependent on the frequency during the next stage of the cycle, d. subtracting a number dependent on the frequency during the next stage so that stages (c) and (d) give an indication of the rate of change of the variable, and e. admitting a constant frequency signal to the counter to return it to its original count stage whilst continuously adjusting the control element, so that the overall change in the position of the control element during the cycle is dependent on the time taken for stage (e) and therefore on the count state at the end of stage (d).

The present invention is aimed at improving the flexibility of this arrangement to enable the characteristics of the apparatus to be adjusted to suit a wide range of applications.

In accordance with the present invention there is provided process control apparatus as claimed in claim 1 of Specification No. 1,106,651 in which said second means for producing a pulsating signal of constant frequency is adjustable to permit selection of said frequency from a range of frequencies, and in which there is provided means operable when the count state of said first counting device attains said predetermined value at the end of said later stage to vary the count state of said first counting device firstly in one sense and then in the opposite sense to generate a new residual count state related to the rate of change of the parameter and third means for producing a pulsating signal of constant frequency selectable from a range of frequencies and means whereby signals from said third means is admitted to the counting device during a further stage of the cycle of operation to cause the count state of the counter to approach its predetermined value, the arrangement being such that, in use, adjustments of the control element are made independent for the duration of both said later stage and said further stage.

The accompanying drawing shows the logic circuit of an example of the invention.

The apparatus includes a first counter 10, hereinafter called the signal counter, and a second counter 11, hereinafter called the timing counter. The signal counter 10 is connected to receive pulses from a reference oscillator 12 which, in the present example produces pulses at a frequency of 1,800 c.p.s. The signal counter has control terminals 10a, 10b, such that the application of a signal at terminal 10a causes pulses applied at the input terminal 10c to "decrease" the count state of the counter and a signal at terminal 10b causes the pulses to increase the count state in known manner.

The signal counter 10 also has associated with it decade switches 13, whereby a suitably routed pulse initially sets the counter 10 to a preselected count state related to the desired value of the parameter to be controlled.

The signal counter can also receive pulses from the timing counter 11 at a reduced frequency for the purpose to be described hereinafter. Such frequency reduction is obtained by using a pair of independent frequency selector switches 14, 15 with a plurality of input connections from the respective stages of the timing counter 11. Thus, if the first stage is selected the frequency will be a quarter of that of the reference oscillator 12, if the second stage is selected the frequency will be one-eighth and so on, the $n$th stage giving a frequency of $1/2n+1$ times the frequency of the reference oscillator 12.

The signal counter 10 can be reset to a zero count state by a signal applied at a terminal 10d.

The timing counter 11 receives pulses at different stages of the operation of the apparatus from the reference oscillator 12 and from a measuring oscillator 16 which includes an element, such as a temperature sensitive resistor, which is sensitive to the value of the parameter to be controlled, so that the frequency of the signal produced is dependent on the measured value of the parameter. The timing counter has a reset connection 11a, at which a signal acts to restore the counter to its zero count state.

The logic circuit of the apparatus includes a sequencing ring counter constituted by the bistable circuits $B_2$ to $B_7$ together with their associated NOR gates. The operation of the ring counter is substantially conventional, being such that all of the bistable circuits except one are in one state, the NOR gate associated with the exceptional bistable circuit is primed thereby so that on the receipt of the next input signal, the NOR gate produces an output, which drives the succeeding bistable circuit into the odd state. This in turn drives the previously odd bistable circuit back into its normal state thereby cutting off the output from the NOR gate. Input signals to the ring counter are produced by a bistable circuit $B_8$ which is such that it is driven between its stable states whenever a signal at its input terminal is removed.

The remainder of the logic circuit is not described in detail but will become apparent from the following description of the operation of the apparatus.

The cycle starts in the condition shown, when the bistable circuit $B_2$ has just been driven into the odd state and both counters have a zero count state. Thus, NOR gates $N_{16}$, $N_4$ respectively having inputs connected to the stages of the signal counter and the timing counter both produce outputs. Thus, no outputs are produced by NOR gates $N_{11}$ and $N_{18}$ which have input terminals connected to the output terminals of gates $N_{16}$, $N_4$ respectively. NOR gate $N_{10}$ which also has an input from NOR gate $N_{16}$ similarly produces no output. NOR gate $N_6$ and $N_8$ produce an output since its inputs are from output terminals of bistable circuits $B_2$ through $B_7$ which have no output at this time. The outputs of $N_6$ and $N_8$ cause NOR gates $N_{19}$ and $N_9$ to produce no outputs. Thus, at this time, a NOR gate $N_7$ which controls the input to the bistable circuit $B_8$ produces an output. Thus, although the NOR gate following the bistable circuit $B_2$ in the ring counter is primed by bistable circuit $B_2$ it will not produce an output until the signal from bistable circuit $B_8$ is removed, $B_8$ having been left in its shown condition by the last operation of $N_9$.

As bistable circuit $B_2$ arrives in the odd state as shown a pulse is delivered thereby to set the signal counter 10 to the "-desired value" count state and to reset a bistable circuit $B_9$ via NOR gates $N_{29}$, $N_{30}$. As a result the signal from gate $N_{16}$ ends and gate $N_{11}$ produces a pulse in phase with a pulse from the oscillator 12 (because of the NOR gate $N_5$ interconnecting the oscillator 12 and the gate $N_{11}$). This pulse causes the output from gate $N_7$ to cease so that bistable circuit $B_8$ changes state. As a result bistable circuit $B_3$ change state and causes bistable circuit $B_2$ to resume its normal state.

For the remainder of the cycle there will thus be an output from bistable circuit $B_2$ blocking gate $N_{11}$ so that this will continuously produce no output. The signal from gate $N_6$ will cease since there will be an input to this gate from bistable circuit $B_3$. Since gate $N_4$ is still producing an output, gate $N_{19}$ will produce an output and no signal will be produced by gate $N_7$. However, the removal of the output from gate $N_6$ also enables pulses from the oscillator 16 to be counted into the timing counter 11 so that as soon as one pulse has been so counted the gate $N_4$ will cease to produce an output and a signal will commence from gate $N_7$. This signal has no logical effect on the bistable circuit $B_8$ at this time, but merely primes the latter for a change of state when a signal is next received by gate $N_7$. Meanwhile bistable circuit $B_3$ delivers a signal to a NOR gate $N_{25}$ controlling the supply of signals to terminal $10_b$ of counter 10. No signal is received by a corresponding NOR gate $N_{20}$, which is connected to receive signals from bistable circuit $B_5$ when in the odd state. Gates $N_{20}$, $N_{25}$ are also fed from gates $N_{21}$, $N_{26}$ respectively and these are in turn fed from the bistable circuit $B_9$ such that inputs to the gates $N_{21}$, $N_{26}$ are mutually exclusive. These gates $N_{21}$, $N_{26}$ also have inputs from a NOR gate $N_8$ with inputs from bistable circuits $B_4$ and $B_7$. Since at the present time both of these circuits are in their normal states gate $N_8$ produces an output to block gates $N_{21}$, $N_{26}$, thereby leaving the decision, as to whether pulses admitted to the signal counter 10 should be added or subtracted, to the gates $N_{20}$, $N_{25}$. As mentioned above only gate $N_{20}$ has no input signal so that the pulses admit to the counter will reduce the count state.

Pulses are admitted to the counter 10 at this stage under the control of a NOR gate $N_{14}$ which has inputs from gate $N_4$, from the reference oscillator 12 and from the gate $N_6$. Thus as soon as the count state of the timing counter 11 is no longer zero pulses will be emitted from gate $N_{14}$ 180° out of phase with the reference oscillator pulses. A NOR gate $N_{22}$ inverts the desired," from gate $N_{14}$ so that the pulses admitted to the counter 10 are in phase with the reference oscillator pulses.

Thus the count state of counter 10 is reduced at a constant rate, until the counter 11 is full and its count state reverts to zero. The time taken for this clearly depends on the mean frequency, over the period concerned, of the signal produced by the measured value oscillator 16. Thus, if this frequency is higher than that corresponding to the desired value of the parameter, the time taken to fill counter 11 will be shorter than that "desired," (i.e. the initial count state programmed into the counter 10 divided by the frequency of the reference oscillator) and the number of pulses fed into the signal counter 10 will be less than the count state initially set. Thus a residue will be left in the counter 10. If, on the other hand the frequency is too low, the time will be longer and the number of pulses admitted to counter 10 will be larger than its initially programmed count state. In this case the counter 10 will, for a short period, be in its zero state and a pulse will be emitted by the gate $N_{16}$. As a result the signal from gate $N_{10}$ will briefly disappear. This will cause a NOR gate $N_{17}$ to produce a pulse since this gate has one input from gate $N_{10}$ and one from a NOR gate $N_{15}$, which, in turn, has inputs from bistable circuits $B_3$ and $B_6$, of which the former is at present, producing an output. The pulse from gate $N_{17}$ will cause the state of binary circuit $B_9$ to be changed.

When the count state of counter 11 reaches zero again the pulse from gate $N_4$, inverted by gate $N_{18}$ and again by gate $N_{19}$ blocks gate $N_7$ to drive the bistable circuit $B_8$ into its original state. Bistable circuit $B_4$ is thus driven into the odd state and bistable circuit $B_3$ returns to its normal state. A signal now appears at gate $N_6$ so that gate $N_{19}$ cannot produce a signal again until bistable circuit $B_5$ has been driven into its odd state. Gate $N_8$ is blocked by the output from bistable circuit $B_4$ so that pulses from the reference oscillator 12 are fed into the timing counter 11. Furthermore, a NOR gate $N_{12}$ previously blocked by a signal from the bistable circuit $B_4$, is now "opened" to allow pulses from the timing counter to pass through the switch 14 into the counter 10.

The effect of these pulses is determined by the state of the binary circuit $B_9$. If this has remained unchanged since reset by bistable circuit $B_2$ at the commencement of the cycle, the gate $N_{21}$ will receive a signal so that gate $N_{20}$ will produce a signal to cause the pulses to reduce the count state of counter 10. If, on the other hand the binary circuit $B_9$ changed state during the period when pulses from the reference oscillator were being admitted to the counter 10, an output is produced by gate $N_{25}$ to increase the count state thereof back towards zero.

During this stage an output is taken from the apparatus to adjust the control element which may, for example, be a flow control valve powered by an electric motor. The output is taken from either of a pair of terminals 17, 18 according to the required direction of adjustment of the control element. The choice of output terminal is governed by the bistable circuit $B_9$ so that if the parameter is excessive the output appears at one terminal and if the parameter is too low the output appears at the other terminal. NOR gates $N_{27}$, $N_{28}$ with inputs from gates $N_{26}$ and $N_{21}$ respectively and both with inputs from gates $N_8$, also have inputs from one of the stages (for example the third) of the timing counter, so that the output at terminal 17 or 18 is pulsed at a reduced frequency.

The pulsed output from the selected terminal 17, 18 continues until the signal counter 10 has a zero count state. Thus the time during which the control element is in motion is directly proportional to the magnitude of the residual count state in the counter 10 and inversely proportional to the frequency of the pulses passed by switch 14.

When gate $N_{16}$ emits a pulse as a result of the return of counter 10 to a zero count state gate $N_9$ passes a pulse to a bistable circuit $B_1$ to reset timing counter 11 to zero and also to the gate $N_7$ to cause the circuit $B_5$ to change to the odd state.

As a result bistable circuit $B_9$ is reset (if necessary) and pulses from the oscillator 16 pass once again into the timing counter 11 and pulses from the reference oscillator pass to the signal counter 10. The terminal $10_b$ of the latter receives a signal from gate $N_{25}$ so that the pulses received by counter 10 increase its count state from zero.

This stage ends when the counter 11 is once again full and thus has a zero count state. The bistable circuit $B_8$ then changes state again and drives bistable circuit $B_6$ into the odd state. This merely has the effect of removing the signal at terminal $10b$ and applying a signal at terminal $10a$ so that the count state of counter 10 is reduced. Gate $N_{17}$ is also primed to change the state of bistable circuit $B_9$ in the event of the count state of counter 10 becoming zero.

This stage of the cycle ends when the timing 11 is again full at which time there may be a residue in counter 10 according to the manner in which the frequency of the measured value oscillator 16 has changed during the two stages whilst $B_5$ and then $B_6$ were in the odd state. If the frequency has increased steadily, then the length of the first of these stages will be greater than the length of the second. Thus counter 10 will finish up with a positive count state. If, on the other hand, the frequency of oscillator 16 has steadily decreased there will be a negative count state, indicated by a change of state of bistable circuit $B_9$.

For the final stage, the bistable circuit $B_7$ is driven into the odd state and a pulsed output is again taken from the appropriate one of the terminals 17, 18. The repetition rate of the pulse train received, by the signal counter 10 is determined by the switch 15. The pulsed output appears at either terminal 17 or terminal 18 for as long as it takes to remove the residue from the counter 10.

At the end of this stage, when counter 10 again registers a zero count state, the circuit $B_2$ is again driven into the odd state and the cycle recommences.

It will be noted that the net effect of the "error" correction made during the time when circuit $B_4$ is odd, and the "rate of change" correction, made while circuit $B_7$ is odd, can be varied to give more or less weight to either correction, by adjusting the switches 14, 15. This enables the characteristics of the apparatus to be varied widely to suit many different process control requirements.

Further flexibility can be achieved by adjustment of the frequencies of the oscillators 12, 16. Thus for a process in which rapid changes occur a short cycle time can be employed by running the oscillations at a higher frequency. For a process in which slow changes occur, on the other hand, a long cycle time is used to ensure that a correction count related to the rate of change can be made. The frequency of the oscillator 16 is adjusted so as to be proportional to that of oscillator 12 for a given value of the parameter.

As mentioned in the parent case modifications may be made to the logic arrangements, and to control several processes or several aspects of the same process or a time-sharing basis, or to adjust a single control element in accordance with some function of two or more variable.

I claim:

1. A cyclically operable process control apparatus comprising a first counting device, setting means operable to set the counting device to a known count state dependent on a required value of the parameter, first means, including an element sensitive to the actual value of the parameter, for producing a pulsating signal the mean frequency of which is dependent on the said actual value, second means for producing a pulsating signal of constant frequency, adjustable to permit selection of said constant frequency from a range of frequencies, means for producing third and fourth pulsating signals derived from the constant frequency signal, sequence control means operable to introduce successive stages in the operating cycle of the apparatus, firstly causing the setting means to set the first counting device to the said known count state, secondly causing the count state of the first counting device to be varied by a number dependent on the frequency of the said variable frequency pulsating signal so as to produce a residual count state which is determined by the deviation of the parameter from its required value, thirdly causing the third pulsating signal to be admitted to the first counting device causing the count state thereof to approach the said predetermined value, fourthly causing the count state of the first counting device, after reaching the said predetermined value to be varied firstly in one sense and secondly in the opposite sense to generate a new residual count state related to the rate of change of the parameter, fifthly causing the fourth pulsating signal to be admitted to the first counting device to cause the count state thereof to approach the said predetermined value, and means operating during the third and fifth stages of operation to apply correcting adjustments to a control element, such adjustments being dependent, on the residual count state and on the new residual count state and on the respective selected frequencies of the third and fourth pulsating signals, to cause the parameter to approach its predetermined value.

2. Process control apparatus as claimed in claim 1 in which said means for producing said third and fourth pulsating signals incorporate a common constant frequency oscillator and a binary counting device to which signals from said oscillator are fed, and further comprise first and second selector switches respectively with input connections from the binary stages of the binary counting device.

3. Process control apparatus as claimed in claim 2 in which said binary counting device is also employed to determine the lengths of the various stages of the cycle of operation of the apparatus.

4. Process control apparatus as claimed in claim 3 arranged so that said new residual count state related to the rate of change of the parameter is generated by delivering pulses to the first counting device from the constant frequency oscillator to change the count state thereof in one sense for a period during which a series of pulses are delivered to the binary counting device from the first means for producing a pulsating signal to complete a cycle of the binary counting device and then delivering a series of pulses from the constant frequency oscillator to the first counting device to change the count state thereof in the opposite sense for a further period during which pulses are delivered to the binary counting device from said first means to complete a further cycle of the binary counting device.